United States Patent [19]

Bando et al.

[11] 4,323,137
[45] Apr. 6, 1982

[54] WORK VEHICLE

[75] Inventors: Niro Bando, Sakai; Junji Miyata, Koaza-yakimachi; Masatsugu Tone, Hashimoto; Haruo Watanabe, Izumi, all of Japan

[73] Assignee: Kubota, Ltd., Osaka, Japan

[21] Appl. No.: 126,067

[22] Filed: Feb. 29, 1980

[30] Foreign Application Priority Data

Mar. 9, 1979 [JP] Japan .............................. 54/30694[U]

[51] Int. Cl.³ ............................................. B60K 17/10
[52] U.S. Cl. ....................................... 180/305; 165/38
[58] Field of Search ...................... 180/305, 132, 139; 165/38; 60/384; 91/446, 448

[56] References Cited

U.S. PATENT DOCUMENTS

| 2,323,994 | 7/1943 | Hilt | 165/38 |
| 2,331,378 | 10/1943 | Dykeman | 165/38 |
| 2,392,214 | 1/1946 | Cruzan | 165/38 X |
| 2,903,244 | 9/1959 | Brown | 165/38 |
| 3,780,820 | 12/1973 | Schwab et al. | 180/305 X |
| 3,989,117 | 11/1976 | Hill | 180/305 |
| 4,132,283 | 1/1979 | McCurry | 180/66 R |

Primary Examiner—Joseph F. Peters, Jr.
Assistant Examiner—Michael Mar
Attorney, Agent, or Firm—Edwin E. Greigg

[57] ABSTRACT

A work vehicle having an oil cooling path through which a working oil within the transmission housing for the hydraulically driven transmission means is circulated to the transmission case through the cooler.

There is disposed a bypass adapted to return the working oil directly to the transmission case from said transmission housing without passing through the cooler when the pressure in said transmission housing exceeds a predetermined value.

3 Claims, 5 Drawing Figures ion is circulated to the transmission case through the cooler.

WORK VEHICLE

BACKGROUND OF THE INVENTION

The present invention relates to a work vehicle having an oil cooling path through which a working oil within the transmission housing for a hydraulically driven transmission means is circulated to the transmission case through the cooler.

In the work vehicle of this type, when considering the flow of a working oil to be circulated from the transmission housing to the transmission case through the cooler, particularly at a cold district or in a severely cold season, the temperature of such working oil becomes low and the viscosity resistance becomes large. Accordingly, the working oil cannot smoothly be flowed in the oil path, resulting in the abnormal rise in the internal pressure in the transmission housing. This presents inconvenience to possibly provoke a trouble such as an oil leak.

In order to restrict such abnormal rise in the internal pressure in the transmission housing occurred when the temperature of the working oil becomes low, it may be proposed to use large-diameter pipes for the oil cooling path and to form the cooler into a large size. However, such structure has a defect in that it is necessary to form piping facilities of a large size and subsequently the costs of equipment, operation and maintenance become expensive.

SUMMARY OF THE INVENTION

In view of the foregoing, the present invention is proposed and has an object to provide a work vehicle which may securely prevent the abnormal rise in the internal pressure in the transmission housing even though the temperature of the working oil becomes low, with the use of small-diameter pipes for the oil cooling path which is advantageous in that economical piping facilities and a compact piping structure may be realized.

In order to achieve the object above-mentioned, the work vehicle according to the present invention has an oil cooling path through which a working oil within the transmission housing is circulated to the transmission case through the cooler and is characterized by a bypass having a relief valve disposed between the transmission housing and the transmission case and adapted to return the working oil from the transmission housing directly to the transmission case without passing through the cooler when the pressure in the transmission housing exceeds a predetermined value.

According to the present invention, with the use of small-diameter pipes for the oil cooling path which is advantageous in that economical piping facilities and a compacted piping structure may be realized, even though the internal pressure in the transmission housing is increased due to large resistance in the oil path when the temperature of the working oil becomes low, the bypass having a relief valve disposed between the transmission housing and the transmission case permits the working oil in the transmission housing to be escaped directly to the transmission case, thereby to prevent the abnormal rise in the internal pressure in the transmission housing, thus enabling to securely eliminate a trouble such as oil leak resulted from such abnormal rise in the internal pressure.

Furthermore, since small-diameter pipes are used for the oil cooling path, when starting a work particularly at a cold district, the inflow of the working oil to the cooler may be restrained, thereby to enable to effectively perform a warming-up operation advantageously.

When such bypass is formed by oil paths formed in drain plugs for the transmission housing and the transmission case, respectively, and a pipe communicated with these oil paths, and the relief valve is incorporated in the drain plug for the transmission housing, it is advantageously possible to economically form the bypass having a relief valve required to achieve the effect above-mentioned, by utilizing the drain plugs which are indispensable constituent elements of the present invention.

Other objects and advantages of the present invention will be apparent from the following description.

BRIEF DESCRIPTION OF THE DRAWINGS

The invention will be further described by way of example, with reference to the accompanying drawings, in which.

DETAILED DESCRIPTION OF THE PREFERRED EMBODIMENTS

Figure 1:
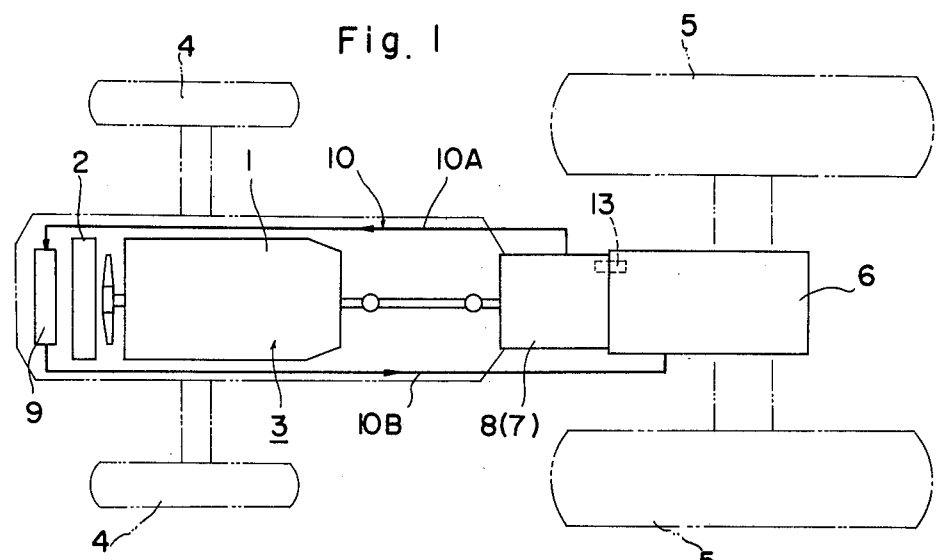
FIG. 1 is a schematic plan view of an embodiment of a work vehicle in accordance with the present invention.
Figure 2:
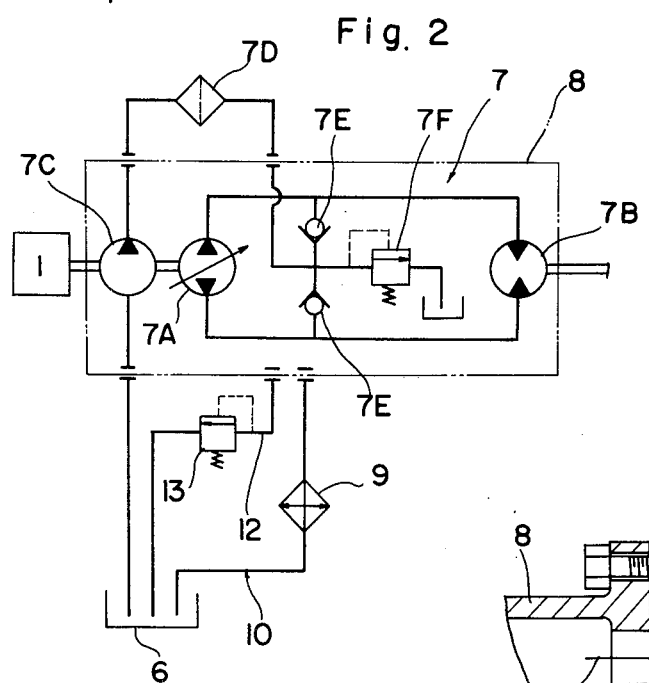
FIG. 2 is a hydraulic circuit diagram of main portions in FIG. 1.

FIG. 1 illustrates a tractor, in which a transmission housing 8 for a hydraulic-type stepless speed change means 7 is connected to and disposed between a prime mover 3 comprising an engine 1 and a radiator 2, and a transmission case 6 for a transmission mechanism for front wheels 4 and rear wheels 5 and a transmission mechanism for a working machine system.

A cooler 9 for cooling a working oil is disposed at the lower end of the air intake side of the radiator 2. Also disposed are a working oil supply pipe 10A and a cooled working oil return pipe 10B both constituting an oil cooling path 10 through which a working oil in the transmission housing 8 is circulated to the transmission case 6 through the cooler 9.

The hydraulic-type stepless speed change means 7 comprises a hydraulic pump 7A of the capacity variable type to be driven by the engine 1 and capable of changing the oil feed amount according to the change in angle of an inclined plate, a hydraulic motor 7B of the constant capacity type for steplessly changing the forward and rearward travelling speeds of the vehicle according to the change in the oil feed amount of the hydraulic pump 7A, a hydraulic pump 7C of the constant capacity type for maintaining the flow amount of the oil in the oil path constant, a filter 7D, check valves 7E and a relief valve 7F.

Figure 3:
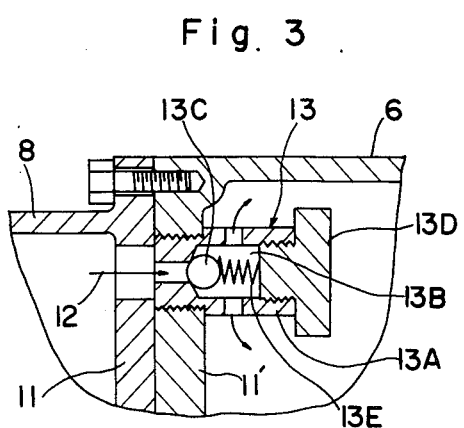
FIG. 3 is an enlarged section view of main portions in FIG. 1.

As also shown in FIG. 3, a bypass 12 is formed in partition walls 11 and 11' for partitioning the transmission case 6 from the transmission housing 8 for the hydraulic-type stepless speed change means 7, the bypass 12 passing through the partition walls 11 and 11' in the longitudinal direction of the vehicle. This bypass 12 has a relief valve 13 adapted to return the working oil within the transmission housing 8 directly to the transmission case 6 without passing through the cooler 9 when the pressure in the transmission housing 8 exceeds a predetermined value.

The relief valve 13 comprises a valve main body 13A threadedly attached to the partition wall 11' of the transmission case 6, a valve chamber 13B formed in the valve main body 13A and adapted to be communicated with the bypass 12, a ball 13C disposed in the valve chamber 13B and adapted to close the bypass 12, a screw means 13D threadedly attached to the opening of the valve chamber 13B, and a spring 13E disposed between the ball 13C and the screw means 13D and for normally applying spring-load to the ball 13C in the bypass closing direction.

The description hereinafter will discuss the modifications of the embodiment above-mentioned with reference to FIGS. 4 and 5, respectively.

Figure 4:
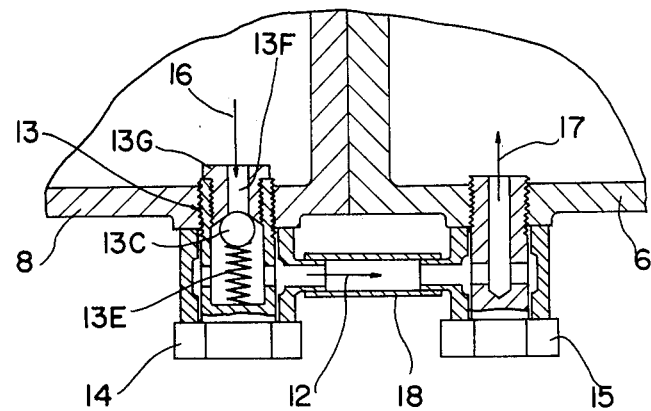
FIGS. 4 and 5 are enlarged section views of main portions of other embodiments of the present invention, respectively.

In the modified embodiment shown in FIG. 4, a bypass 12 is formed by oil paths 16 and 17 formed in the drain plugs 14 and 15 threadedly secured to the lower walls of the transmission housing 8 and the transmission case 6, and a pipe 18 communicated with these oil paths 16 and 17.

A relief valve 13 is incorporated in the drain plug 14 of the transmission housing 8. The relief valve 13 comprises a screw means 13G having an oil path 13F threadedly secured to the drain plug 14, a ball 13C adapted to close the oil path 13F of the screw means 13G, and a spring 13E for normally applying spring-load to the ball 13C in the oil path closing direction.

Figure 5:
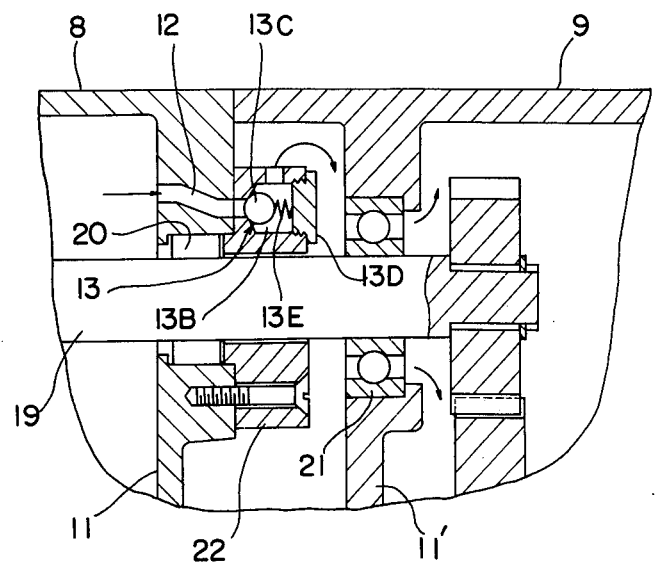

In the modified embodiment shown in FIG. 5, a transmission shaft 19 passing through the partition walls 11 and 11' of the transmission housing 8 and the transmission case 6 is rotatably supported by bearings 20 and 21. A bush 22 of the bearing 20 at the side of the transmission housing 8 is disposed between the partition walls 11 and 11'. The bypass 12 is formed in and passes through the bush 22 and the partition wall 11 of the transmission housing 8.

A relief valve 13 is incorporated in the bush 22. The relief valve 13 comprises a valve chamber 13B formed in the bush 22, a ball 13C disposed in the valve chamber 13B and adapted to close the bypass 12, a screw means 13D threaded to the opening of the valve chamber 13B, and a spring 13E disposed between the ball 13C and the screw means 13D and for normally applying spring-load to the ball 13C in the bypass closing direction.

We claim:

1. A work vehicle, comprising:
    an engine (1),
    a hydrostatic transmission (7) operatively connected to said engine (1) and disposed within a first housing (8),
    a second housing (6) integrally connected to said first housing (8) and containing therein a transmission gearing, said second housing (6) serving as a reservoir for actuating oil for said hydrostatic transmission (7),
    pump means (7C) for feeding actuating oil from said second housing (6) to said first housing (8),
    a cooling circulation system (10) for cooling the actuating oil for said hydrostatic transmission (7), said cooling circulation system (10) including a cooler (9), a supply conduit (10A) for supplying the actuating oil heated by said hydrostatic transmission (7) to said cooler (9) from said first housing (8), and a return conduit (10B) for returning the actuating oil cooled by said cooler (9) to said second housing (6) from said cooler (9), and
    a bypass (12) disposed independently of said cooling circulation system (10) and having a relief valve (13), said bypass (12) being formed to pass through a connection wall portion (11) of said first housing and a connection wall portion (11') of said second housing
    whereby the actuating oil in said first housing (8) is directly returned to said second housing (6) from said first housing (8) without passing through said cooling circulation system (10) when the oil pressure in said first housing (8) exceeds a predetermined value.

2. A work vehicle as defined in claim 1, wherein said relief valve (13) is attached to said connection wall portion (11) of said first housing (8).

3. A work vehicle as defined in claim 1, wherein said relief valve (13) is attached to said connection wall portion (11') of said second housing (6).

* * * * *